Jan. 28, 1947.  J. R. CAMPBELL  2,414,799
ELECTRIC HEATER
Filed March 22, 1943
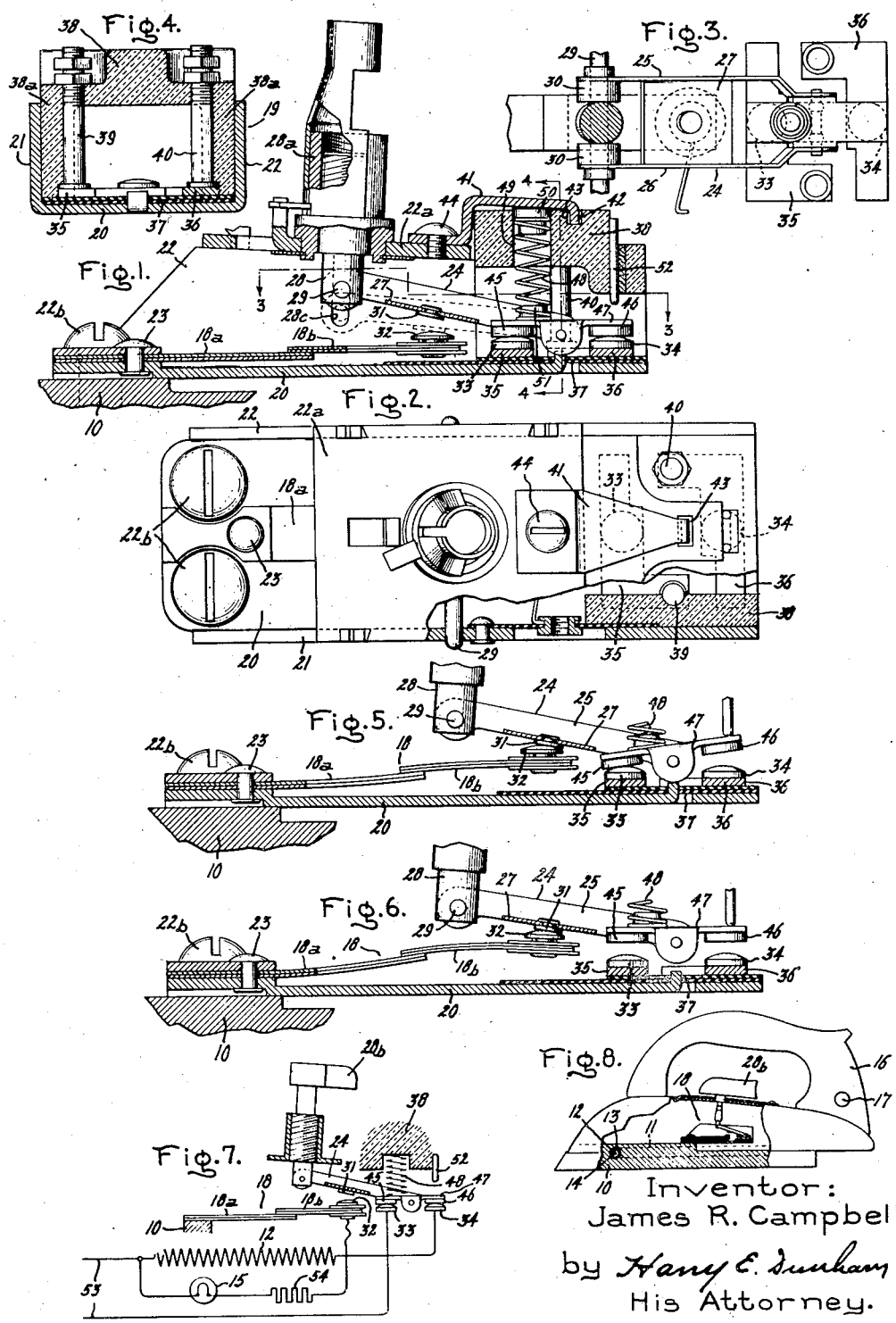
Inventor:
James R. Campbell,
by Harry E. Dunham
His Attorney.

Patented Jan. 28, 1947

2,414,799

UNITED STATES PATENT OFFICE 2,414,799

ELECTRIC HEATER

James R. Campbell, Ontario, Calif., assignor to General Electric Company, a corporation of New York Application March 22, 1943, Serial No. 480,003

10 Claims. (Cl. 177—311)

This invention relates to electric heaters, such as an electrically heated appliance like a flatiron, more particularly to electric heaters of this character which are provided with temperature responsive means for automatically holding a preselected temperature in the heated device, and it has for its object the provision of means for giving a signal when the device is at the proper temperature set by the temperature responsive means.

More specifically, this invention contemplates the provision of an improved electrically heated device of the thermostatically controlled type which is provided with a signal which will give indication showing when the heated device is or is not in the temperature range for which the thermostat is set. In other words, the signal device is controlled to give a signal when the temperature of the heated device rises and substantially attains the temperature set by the thermostat and thereafter gives a signal continuously while the thermostat cycles between the low and high limits of its normal temperature amplitude in order to hold the temperature of the device substantially constant. As long as the thermostat operates within this range the signal is given continuously so that the operator knows that the temperature of the device is within the range set by the thermostat. But if for any reason, such as by a change in the temperature setting of the thermostat, the instant temperature of the device is either above or below the limits of this range, the signal goes off, indicating that the heated device is not at the proper temperature.

In accordance with this invention in one form thereof, the signal device is controlled by the movements of the thermostat which is provided to control the energization of the device to control its temperature. As the thermostat moves responsively to a rising temperature in the device it functions first to cause the signal device to give an indication, and then it functions to deenergize the heating element of the device; subsequently, it cycles between the low and high limits of its temperature amplitude to reenergize and deenergize the heating element to hold the temperature in the device. All of this time it controls the signal device to give a continuous signal indicating that the heated device is within the proper temperature range. If the temperature setting of the device be changed or if for any other reason the instant temperature of the device is not within the desired temperature range, the thermostat operates the signal to shut off its indication, thereby showing that the device is not at the proper temperature.

For a more complete understanding of this invention, reference should be had to the accompanying drawing in which Fig. 1 is a vertical sectional view taken through control means for a heated device arranged in accordance with this invention; Fig. 2 is a plan view of the device shown in Fig. 1, parts being broken away so as to illustrate certain details of construction; Fig. 3 is a sectional view taken through the line 3—3 of Fig. 1 and looking in the direction of the arrows; Fig. 4 is a sectional view taken through the line 4—4 of Fig. 1 and looking in the direction of the arrows; Figs. 5 and 6 are fragmentary sectional views of a portion of the control device shown in Figs. 1-3, and illustrating certain elements in different operative positions in the two figures respectively; Fig. 7 is a diagrammatic view illustrating the heating element of the heated device, the signal device, and certain control elements therefor, all arranged in accordance with this invention; and Fig. 8 is a vertical sectional view taken through an electric flatiron provided with the control device shown in Figs. 1-7.

Referring to the drawing, this invention has been shown in one form as applied to an electrically heated flatiron (Fig. 8). This iron comprises a sole plate 10. Cast within the sole plate 10 is an electrical heating element 11 of the sheathed type; as shown in Fig. 8, this element 11 is provided with a helical resistance conductor 12 which is mounted within an outer metallic casing 13 and which is held in spaced relation with reference to the casing 13 by a mass 14 of heat conducting, electrically insulating material, such as magnesium oxide.

The signal device for indicating when the sole plate 10 is within the proper operating temperature range consists of an electric incandescent lamp 15. In the flatiron application shown in Fig. 8, the lamp may be located within the rear standard of the handle 16 back of a window 17. The window preferably will be covered by glass which will have a distinctive color such as red.

The energization of the heating element 12 and that of the signal device 15 is controlled by means of a temperature responsive member 18, which preferably and as shown will be of the bimetallic type, and preferably it will be of the type described and claimed in the United States patent to Russell A. Winborne No. 2,128,869, dated August 30, 1938. As shown, it comprises a main part 18a and a compensating section 18b arranged as fully described in the aforementioned Winborne patent.

The thermostatic element 18 is mounted within a channel-shaped metallic casing 19 which has a bottom wall 20 and a pair of side walls 21 and 22; it also has a top wall 22a. The casing is clamped to the sole plate 10 by means of screws 22b. The left-hand end of the bimetal element section 18a, as viewed in the drawing, is clamped to the bottom wall 20 by means of a rivet 23. The other end of the thermostatic blade 18 is free to move upwardly and downwardly in the casing responsively to temperature changes. When the temperature of the blade rises the free end moves upwardly, whereas when it cools the free end moves downwardly.

The blade 18 controls suitable switching mechanism which is mounted within the casing 19, and which controls the energization of the heating element 12 and the signal lamp 15. This switching mechanism comprises a switch arm 24 which has a pair of spaced apart side members 25 and 26 that are joined together by a transverse plate section 27. The left-hand ends of the two side members 25 and 26, as viewed in the drawing, are pivotally secured to an adjusting post 28 by means of a transverse pin 29 extending through apertures provided for it in the post and in the ends of the two members. The switch arm 24 functions as an electrical conductor, and it is electrically insulated from the pin 29 by means of electrically insulating bushings 30. The post 28 is threaded into a bushing 28a which may be rotated so as to adjust the vertical position of the post, and hence, the position of the pivoted end of the switch arm 24 with reference to the thermostatic blade 18. This is for the purpose of adjusting the temperature setting of the control device. The bushing 28 is provided with an adjustment knob 28b outside of the iron shell, as shown. The transverse pin 29 is sufficiently long to extend through openings 28c provided in the opposite side walls 21 and 22 of the casing. These openings, as shown, are vertically elongated to provide for the vertical adjustment of the post. In other words, the pin 29 is a "floating" cross-member.

The transverse plate 27 carries an electrical contact 31 which coacts with a contact 32 mounted on the movable end of the thermostatic blade 18. The switching mechanism further comprises a pair of spaced-apart fixed contacts 33 and 34 which are mounted upon the bottom wall 20 of the casing 19. As shown more clearly in Fig. 3, these contacts are mounted directly on conducting plates 35 and 36 which are electrically insulated from the bottom wall by electrically insulating sheets 37 formed of any suitable electrically insulating material, such as mica. The conducting plates 35 and 36 and the electrically insulating sheets 37 are clamped against the bottom plate 20 by means of an electrically insulating block 38, as clearly shown in Fig. 4. It will be observed that this block has an inverted U shape, the two opposed arms 38a of the block functioning to clamp the conducting plates and insulating sheets against the bottom wall, and further to hold the two plates in their proper operative positions. Secured to the plates 35 and 36 are upright posts 39 and 40 which extend upwardly through openings provided for them in the base of the insulator 38 and which function as binding posts to which electrical connections are made. The insulator is secured in position to the top wall 22a by means of a bracket 41 which has a section 42 extending downwardly into a recess 43 provided for it in the top of the insulator and which is secured to the top wall by means of a screw 44.

Cooperating with the fixed contacts 33 and 34 are a pair of contacts 45 and 46. These contacts are mounted on the opposite ends of a rocker arm 47 which is pivoted intermediate its ends to the end of the switch arm 24 opposite the end of this arm that is connected to the adjusting post 28. A compression spring 48 bears on the rocker arm to the left of its pivotal mounting on the switch arm, as viewed in the various figures, for biasing the contact 45 into engagement with its fixed contact 35. This spring, as shown, is inserted in an aperture 49 provided for it in the insulator, and has its two ends received in holding studs 50 and 51, respectively, the former being mounted in the upper end of the aperture 49 and the latter being mounted upon the rocker 47. Moreover, there is a suitable stop 52 which is mounted on the insulator above the contact 46 carried by the rocker. This stop functions to limit the upward movement of the contact 46 with reference to its fixed contact 34.

The various contacts are electrically interconnected with the heater 12 and the signal device 15, and the system is connected with a suitable source of electrical supply 53 indicated diagrammatically in Fig. 7. That is, the contact 31 is electrically interconnected through the switch arm 24 with the two contacts 45 and 46 on the rocker 47; the contact 32 on the thermostat is electrically connected to one terminal of the signal lamp 15, the opposite terminal of which is connected to one terminal of the heater 12 and to one side of the supply source 53; fixed contact 33 is electrically connected through its post 39 with the opposite side of the supply source 53; and the fixed contact 34 is electrically connected through its post 40 to the other side of the heater 12, as shown. A resistance 54 is connected in series with the lamp 15 so that a lamp with a low voltage filament may be used.

When the iron is cold, the thermal blade 18 is in its position shown in Figs. 1 and 7. Now if the iron be "plugged" into the supply source 52, the heating element 12 will be energized through a circuit which may be traced from the upper conductor of the supply source, through the heating element 12, through the closed contacts 34 and 46, through the rocker arm 47, and thence through the closed contacts 45 and 33 to the lower conductor of the supply source; the signal lamp 15 at this time is deenergized because the contacts 31 and 32 are open.

Therefore, the heating element 12 will apply heat to the sole plate 10 and elevate its temperature. As the temperature of the sole plate 10 rises, the thermal bar 18 moves upwardly from its position shown in Figs. 1 and 7 toward its position shown in Fig. 5. When the sole plate 10 attains substantially the high temperature set by the thermostat, the thermostat 18 will move its contact 32 into contact with the contact 31 on the switch arm 24, which operation will energize the signal lamp 15 from the upper conductor of the supply source, through the signal lamp 15, the resistance 54, closed contacts 31 and 32, switch arm 24, rocker 47, and thence through the closed contacts 45 and 33 to the lower conductor of the supply source. The heater 12, however, remains energized, and the temperature of the sole plate continues to rise, and as a result the thermal bar continues to rise and will move the switch arm 24 upwardly, as shown in Fig. 5. Inasmuch as the spring 48 biases the rocker arm 47 to hold the contacts 45 and 33 closed, the contacts 46 and 34 will open. This operation, of course, will deenergize the heating element 12; it will not, however, deenergize the signal lamp 15, the energization of which is maintained through the closed contacts 31 and 32, and 33 and 45. Following the deenergization of the heating element 12, the sole plate 10 will cool and the thermostat bar will move downwardly to permit the contact 46 to reclose contact 34 which will reenergize the heating element 12. Following this, the thermostat again will be heated to move upwardly to open the contact 46 and deenergize the heater 12. In this way, the thermostat bar 18 will oscillate the switch arm 24 to open and close the contacts 46 and 34 to hold a substantially constant temperature in the iron; that is, when the temperature of the iron falls responsively to the deenergization of the heater 12 and the temperature of the bar falls by a predetermined amount to a lower value, the heater 12 will be reenergized, and when the temperature of the bar rises by a predetermined amount to a higher value the heater will be deenergized. The range between the low and high temperatures at which the thermostatic bar operates in this way is known as its temperature "amplitude." And while the thermostat operates through its amplitude, the contacts 31 and 32 will remain closed and the contacts 33 and 45 will be biased closed so that the signal lamp 15 will be continuously energized, thereby indicating that the iron is at the proper temperature. This operation is true for any particular temperature set by the knob 28b.

Now, if the iron be operating at a selected temperature, and it be desired to operate the iron at a higher temperature, the adjustment post 28 will be moved upwardly from the thermostat 18. This operation, of course, will permit the contacts 34 and 46 to reclose to reenergize the heater 12 so as to elevate the temperature of the iron up to the new setting. Also, this operation of the switch arm will open contacts 31 and 32 to deenergize the signal lamp 15 to show that the iron is not at the proper temperature. As the sole plate temperature rises, the thermostat 18 will bend upwardly, and the afore-described operation will be repeated; that is, the thermostat will close the contacts 31 and 32 to energize the signal lamp 15, and after this, it will oscillate the contacts 46 and 34 between open and closed positions to control the energization of heater 12 to hold the new temperature. The signal lamp again continuously indicates that the iron is operating within the proper temperature range.

If now it should be desired to set the iron to operate at a lower temperature, the adjustment post 28 will be lowered. This operation will fulcrum the switch arm 24 on the contact 32 of the thermostat and elevate the rocker 47 to cause it to engage the stop 52 to thereby pivot the rocker with relation to the switch arm and open the contacts 45 and 33, as shown in Fig. 6. When these contacts open, the energizing circuit for the signal lamp is broken, and the signal is shut off to show that the iron is not now at the correct temperature for the setting. Following this, the sole plate will cool down and so will the thermostat 18 which will deflect toward the bottom plate 20. Just prior to the time that the sole plate reaches the desired low temperature, the switch arm 24 will have swung downwardly sufficiently far to permit the contacts 45 and 33 to reclose. This operation will reenergize the signal lamp 15. And following this, when the iron has attained the desired low temperature the thermostat 18 will have moved down sufficiently far to permit the contacts 46 and 34 to reclose, which operation will again reenergize the heater 12. Then the thermostat will move upwardly and downwardly responsively to increases and decreases in the temperature of the sole plate so as to cycle the contacts 46 and 34 between open and closed positions to hold the desired low temperature, all as fully described before. All of this time, however, the signal lamp 15 will be energized through the contacts 31 and 32 and the contacts 33 and 45.

Therefore, for any particular setting of the thermostat, and as long as the iron is operating within the range of the temperature amplitude of the thermostat, the signal lamp 15 will be energized to indicate that the iron is at the proper operating temperature. If for any reason the temperature of the sole plate 10 be below or above the desired range, the signal lamp will be deenergized thereby indicating that the iron is not at the proper temperature.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In an electrically heated device having a heating element, a switch connected to control the energization of said heating element, a thermostat, a lever connected to said switch to operate it, said lever being engaged by said thermostat as it heats up so that it is moved to open said switch to deenergize said heater at a predetermined high temperature and when said thermostat cools said lever is moved to reclose said switch to reenergize said heater, said switch thereafter being operated to open and close to deenergize and reenergize said heater to hold a substantially constant temperature in said device as said thermostat cycles responsively to heating and cooling, an electrically responsive signal device, a second switch operated responsively to the interengagement of said lever and thermostat for causing said signal device to give a signal continuously as long as said thermostat cycles to hold said substantially constant temperature, means for adjusting the position of said lever to adjust the temperature held in said heated device, and a third switch for controlling said signal device controlled by the operation of said lever so that when said lever is adjusted to a temperature setting lower than the instant temperature of said heated device said third switch is operated to deenergize said signal device irrespective of the fact that said thermostat and lever are in engagement.

2. In an electrically heated device having a heating element, a thermostat responsive to the temperature of said heated device, a signal lamp, a control switch mechanism for controlling the energization of said heating element and said signal lamp having a first set of coacting contacts connected in the energizing circuit of said heating element, and a second set of coacting contacts connected in the energizing circuit of said lamp, one contact of said second set being movable by said thermostat and the other contact of said set being mechanically interconnected with one of the contacts of said first set, said thermostat when it heats and deflects moving said one movable contact of said second set into engagement with its coacting contact to energize said lamp, and said first set of contacts being operated by the mechanical connection between said other contact of said second set and said one contact of said first set to deenergize and reenergize said heating element to hold a substantially uniform temperature in said heating device by the cycling action of said thermostat.

3. In an electrically heated device having a heating element, a signal lamp, a thermostat responsive to the temperature of said heated device, a control switch mechanism for controlling the energization of said heating element and said signal lamp having a first set of normally closed coacting contacts connected in both the energizing circuits of said heating element and lamp, a lever connected to one of said contacts to control the operation of said contacts, a second set of coacting contacts connected in the energizing circuit of said lamp, one contact of which is movable by said thermostat and the other of which is mounted on said lever and by said lever is electrically and mechanically interconnected with one of the contacts of said first set, the two sets jointly controlling said signal lamp so that when said thermostat heats and thereby deflects it moves said one movable contact into engagement with its coacting contact to energize said lamp, said switch mechanism also having a third set of coacting contacts connected in the energizing circuit of said heating element and one contact of which is mechanically and electrically connected with said movable contact of said second set to deenergize and reenergize said heating element to hold a substantially uniform temperature in said heating device following the interengagement of said second set of contacts and said thermostat moves said lever responsively to its heating and cooling, means for adjusting the position of said lever to adjust the temperature setting of said heated device, and said second set of contacts being operated to open said lamp energizing circuit to deenergize said lamp when the temperature of said heated device is above that set by said lever.

4. In an electrically heated device having a heating element, a signal device, energizing circuits for said heating element and signal device, switch means for controlling said circuits having a pair of switch elements, one for controlling the circuit of said heating element and the other for controlling the circuit of said signal device, and also having a third switch element common to the circuits of both said heating element and signal device, a thermostat responsive to the temperature of said heated device controlling said switch means to operate said switch control element for said heating element circuit to deenergize and reenergize it so that said heating element holds a substantially uniform preselected temperature in said device by the thermostat cycling in a normal temperature amplitude as the device heats and cools, to operate said switch control element for said signal device circuit to cause said signal device to give a signal continuously when the thermostat operates within the limits of said normal temperature amplitude, and said thermostat operating said third switch control element for said heating element and signal device to a deenergizing position when the temperature of the device is above the temperature setting of said thermostat to break the circuits of both said signal device and heating element.

5. In an electrically heated device, a heater for heating said device, a thermostat responsive to the temperature of said device, an electric signal lamp, control means for said heater and lamp comprising, switch means for controlling the energization of said heater, an operating member for said switch means for operating it to deenergize and reenergize said heater responsively to movements of said member, a pair of cooperating contacts for controlling the energization of said signal lamp, one mounted on said operating member and the other on said thermostat, the latter being moved into engagement with the former when said thermostat deflects responsively to temperature increase and when moved into engagement functioning to cause said signal lamp to give a signal, and thereafter moving said operating member to deenergize and reenergize said heater to hold a substantially constant temperature in said device as said thermostat deflects in opposite directions as it heats and cools, said interengaged pair of contacts all the while continuing to cause said signal lamp to give said signal, adjustable means for varying the positional relationship between said thermostat and operating member to change the temperature setting of said control means and thereby the temperature held in said device, and additional switch means for controlling said signal lamp controlled responsively to the operation of said adjustable means so that when said adjustable means is operated to set a lower temperature than the instant temperature of said device said additional switch means is operated to cause said signal device to cease giving said signal, irrespective of the fact that said pair of contacts are in engagement.

6. In an electrically heated device having a heating element, a switch for controlling the energization of said heating element, a thermostat responsive to the temperature of said device, a single movable member connected to said switch to operate it so that when said member is moved in one direction it opens said switch to denergize said heating element and when moved in the other direction it recloses said switch to reenergize said heating element, a contact on said movable member and a coacting contact on said thermostat, said thermostat moving said coacting contact into engagement with the contact on said movable member as said thermostat heats up so that said movable member is moved by said contacts in said one direction to operate said switch to deenergize said heater, and then as said thermostat cools moves in the other direction to operate it to reenergize said heater, and thereafter is moved to deenergize and reenergize said heater in a series of cycles to hold a substantially constant temperature in said device, all by the interengaged pair of contacts which are held in engagement and operated by said thermostat as it heats and cools, an electroresponsive signal device, and an energizing circuit for said signal device, the energization of which is controlled by said pair of contacts so that it is energized to cause said signal device to give a signal when said contacts are moved into engagement with each other and all the while said control member is operated by them in said series of cycles to hold said substantially constant temperature in said device.

7. In an electrically heated device provided with a heating element, an electric signal device, and control means for said heating element and signal device comprising, a thermostat operated responsively to the temperature of said device, a movable switch arm, cooperating contacts on said switch arm and thermostat respectively controlling said signal device, two pairs of cooperating contacts one contact of each pair being movable by said switch arm, the first set of said pairs controlling said signal device and heating element, and the second set controlling said heating element, and said thermostat when operating responsively to a rising temperature condition in said device causing its contact to engage with its cooperating contact on said switch arm to energize said signal device to give a signal through said first set of contacts and then moving said switch arm to open said second set of contacts to deenergize said heating element upon said device attaining said predetermined temperature and subsequently cycling said second set between opened and closed positions to hold substantially said temperature, the signal device all the while remaining energized to give its signal through said cooperating contacts on said thermostat and switch arm and said first set of contacts, and means controlling the operation of the movable pair of contacts of the two sets responsively to the movement of said thermostat so that if the instant temperature of said device is above the setting of said thermostat said first set of contacts are opened to deenergize said signal device.

8. In an electrically heated device provided with a heating element, an electric signal device, and control means for said heating element and signal device comprising, a thermostat operated responsively to the temperature of said device, a movable switch arm, a pair of cooperating contacts controlling said signal device, one on said thermostat and the other on said switch arm, a second pair of cooperating contacts controlling said signal device jointly with said first pair and also controlling said heating element, a third pair of cooperating contacts controlling said heating element, one each of said second and third pairs being mounted on said switch arm for movement relatively to said switch arm and being movable by said switch arm with reference to the other contacts of said pairs, and said second contacts on said switch arm being mechanically interconnected, biasing means holding said second pair of contacts together, said thermostat upon moving responsively to a rising temperature in said device causing its contact to engage its cooperating contact on said switch arm to energize said signal device to give a signal through said second pair of contacts, and upon further movement moving said switch arm to open said third pair of contacts to deenergize said heating element, the second pair however being held closed by said biasing means to maintain the energization of said signal device to continue its signal, said thermostat subsequently cycling to control said third pair of contacts to close and reopen in a series of cycles to maintain a substantially uniform temperature in said device, said biasing means all the while holding said second pair of contacts closed to maintain the energization of said signal device to continue its signal, and a stop for limiting the movement of the movable contact of said third pair away from its associated contact so that when said contact engages said stop, said movable contact of said second pair is moved away from its associated contact by the connection means between it and the movable contact of said third pair, whereupon said signal device is deenergized to stop its signal.

9. In an electrically heated device provided with a heating element, a signal device, and means for controlling said heating element and signal device comprising, a movable switch arm, and a rocker arm pivoted to said switch arm, a pair of spaced contacts on said rocker arm, a pair of spaced fixed contacts cooperating with said pair respectively, means biasing said rocker arm to bias the first set of said pairs together, said first set controlling said signal device and heating element, and said second set controlling said heating element, a thermostat responsive to the temperature of said device, a third set of contacts, one on said switch arm and the other on said thermostat, said third set controlling said signal device jointly with said first set, said thermostat moving when the temperature of said device rises to cause its contact to engage that on said switch arm to energize said signal device to give its signal through said first set of contacts and upon further movement moving said switch arm to tend to separate said contacts on said rocker arm from their cooperating contacts, said biasing means however holding said first set closed to maintain the energization of said signal device to continue its signal, and the third set opening to deenergize said heating element, said thermostat subsequently oscillating said arm as the thermostat cools and heats to reclose and open said third set to hold a substantially constant temperature in said device, means for shifting the position of said switch arm to change the temperature held in said device, and a stop for limiting the movement of the movable contact of said third set away from its fixed contact by said switch arm so that when the temperature of said device is above that set, said second set of contacts are opened to deenergize said signal device to shut off its signal.

10. In a flatiron and the like provided with a heating element, a signal device, and control means for said heating element and signal device comprising, a thermostat responsive to the temperature of said iron, a switch arm, means pivoting one end of said switch arm, means for adjusting the position of said last-named means to adjust the position of said switch arm, a first contact on said switch arm located between its ends, a rocker, means pivoting said rocker to the other end of said switch arm, a second contact on said thermostat coacting with said first contact, third and fourth contacts on the two ends of said rocker, fifth and sixth fixed contacts cooperating with said third and fourth contacts respectively, a spring biasing said rocker to hold said third and fifth contacts together, said thermostat when heated moving said first contact into engagement with said second contact and upon further movement shifting said switch arm to open said fourth and sixth contacts, said spring functioning to hold said third and fifth contacts closed, a stop for engaging said rocker to limit the movement of said fourth contact away from said sixth contact so that if said thermostat continues its heating movement or said switch arm is adjusted for a lower temperature than the instant temperature of said device said fourth contact engages said stop to move said rocker to open said third and fifth contacts, an energizing circuit for said signal device controlled jointly by said first and second and said third and fifth contacts, and an energizing circuit for said heating element controlled by said third and fifth and said fourth and sixth contacts.

JAMES R. CAMPBELL.